April 27, 1965  N. H. VOGT ETAL  3,180,382
APPARATUS FOR SEVERING HOG CARCASSES
INTO BELLY AND FATBACK PORTIONS
Filed June 20, 1962  4 Sheets-Sheet 3
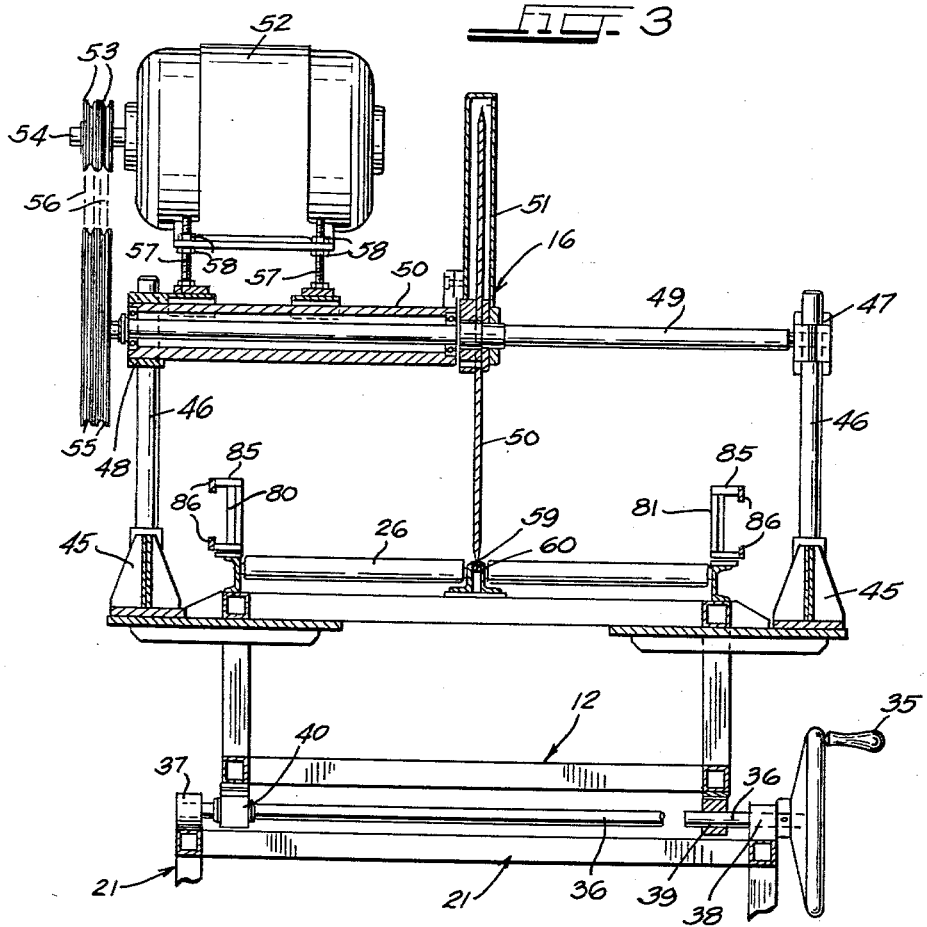
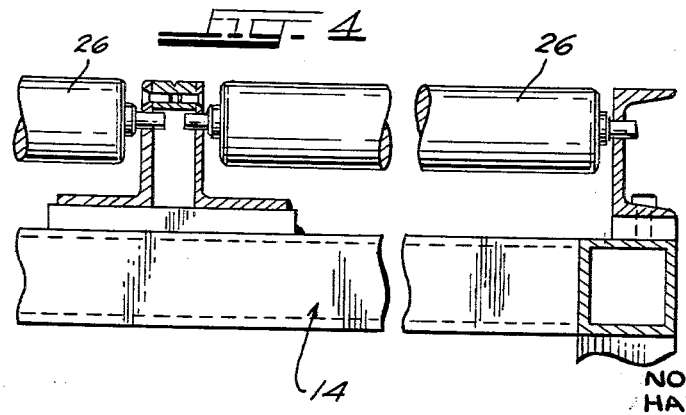
INVENTORS
NORMAN H. VOGT
HARRY W. WEPRIN
BY Carl C. Batz
ATT'Y April 27, 1965
N. H. VOGT ETAL
3,180,382
APPARATUS FOR SEVERING HOG CARCASSES
INTO BELLY AND FATBACK PORTIONS
Filed June 20, 1962
4 Sheets-Sheet 4
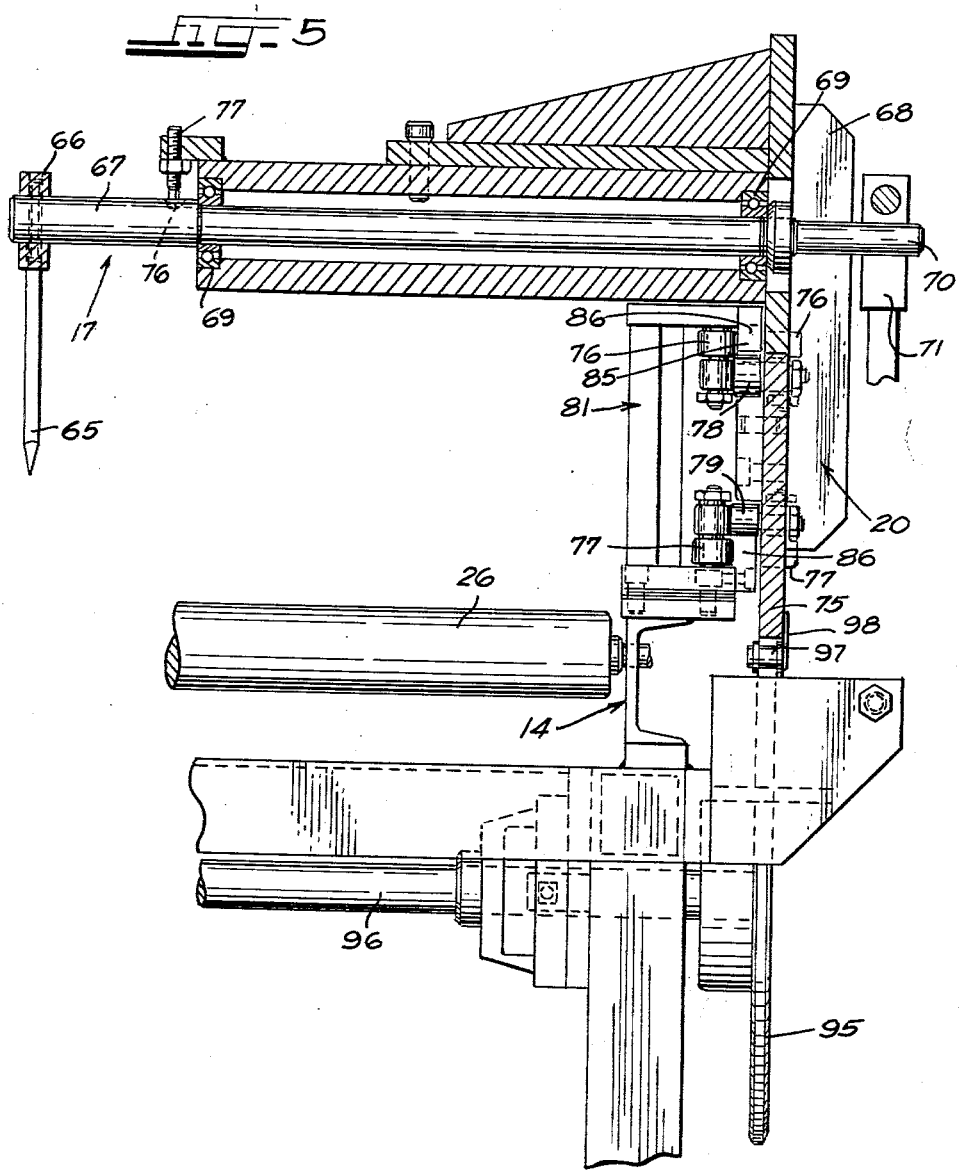
INVENTORS
NORMAN H. VOGT
HARRY W. WEPRIN
BY Carl C. Batz
ATT'Y.

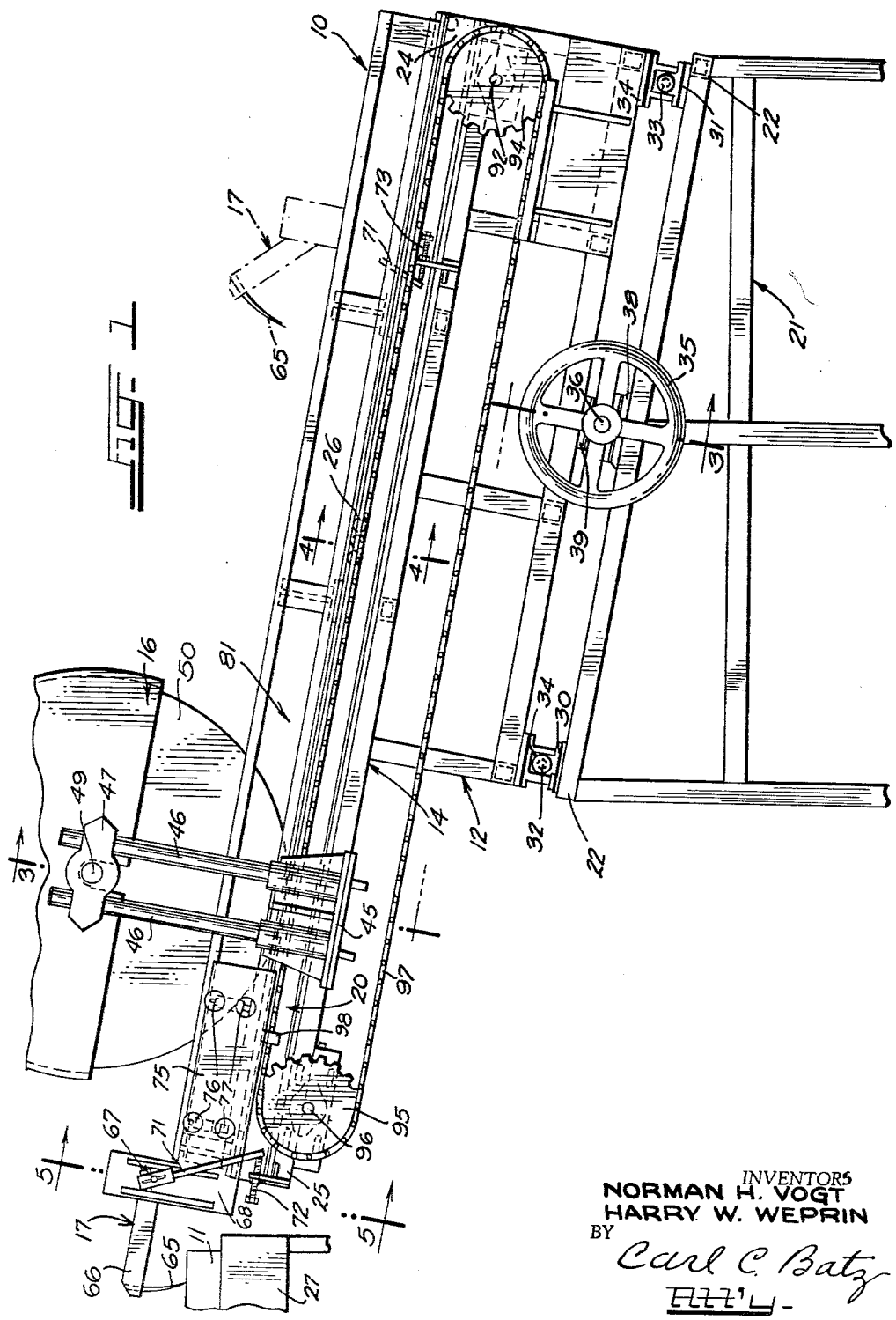

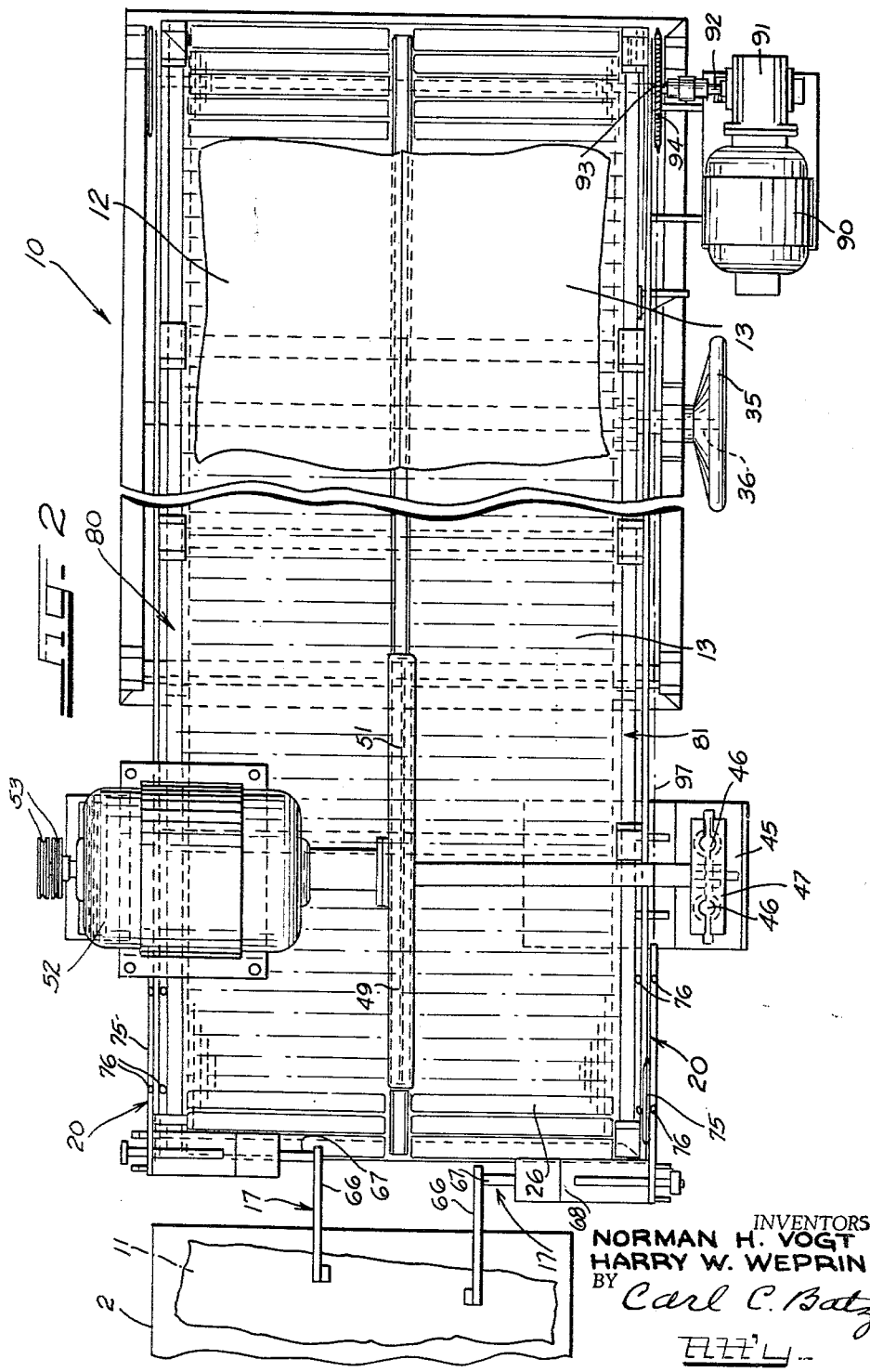

3,180,382
APPARATUS FOR SEVERING HOG CARCASSES INTO BELLY AND FATBACK PORTIONS
Norman H. Vogt, Clawson, Mich., and Harry W. Weprin, Chicago, Ill., assignors to Armour and Company, Chicago, Ill., a corporation of Delaware
Filed June 20, 1962, Ser. No. 203,931
3 Claims. (Cl. 146—73)

This invention relates to an apparatus for separating a mass into a plurality of portions. For purposes of explanation, the invention herein described relates particularly to the separation of a portion of a hog carcass into a belly and a fat back.

It is a principal object of this invention to provide novel means for dividing a mass into a plurality of parts.

It is a particular object of this invention to provide means for separating a hog belly from a hog fat back.

It is another object of this invention to provide apparatus for engaging each portion of the mass to be divided for the purpose of pulling the entire mass through a severing means and also for continuing to move the severed portions separately.

It is also an object of this invention to provide an apparatus for engaging a pre-positioned hog carcass portion, pulling the same through cutting means for the purpose of separating the meat mass into desired portions, and then separately moving each of the desired portions.

Further purposes and objects of the present invention will appear as the specification proceeds.

One embodiment of the present invention is illustrated in the accompanying drawings, wherein:

FIG. 1 is a side elevational view of the severing apparatus;

FIG. 2 is a partially broken, top plan view of the embodiment of FIG. 1;

FIG. 3 is a sectional view taken along line 3—3 of FIG. 1;

FIG. 4 is an enlarged partially broken sectional view taken along line 4—4 of FIG. 1; and FIG. 5 is an enlarged partially broken sectional view taken along line 5—5 of FIG. 1.

Although the present description of the invention relates particularly to the separation of a belly from a fat back of a hog carcass portion, it is to be understood that this apparatus is useful for many other purposes. The belly and back-splitting process and apparatus which are to be described may be utilized in the carcass break-up apparatus described in pending patent applications Serial No. 77,121, filed December 20, 1960, and Serial No. 110,076, filed May 15, 1961. Although the present apparatus may be used as a unitary machine, for maximum utilization, it is preferred that it be used in conjunction with an automated system.

With reference to FIG. 1, the apparatus, generally 10, for separating hog carcass portion 11 into a belly 12 and fat back 13, generally comprises a frame, generally 14, apparatus 16 mounted on frame 14 for severing mass 11 into portions 12 and 13, members, generally 17, for engaging mass 11 in each of portions 12 and 13, carriages, generally 20, movably mounted on frame 14 for holding members 17 whereby mass 11 is moved through cutting apparatus 16 so belly 12 and back 13 are separated from each other.

Referring to FIG. 1, the frame 14 is positioned upon a base 21. Since base 21 has an angled upper surface 22, frame 14 is provided with a lower end 24 and a higher end 25, frame 14 being angled in a downward direction so that the movement of the meat 11 is facilitated during its path of travel. Also facilitating the downward movement of meat 11 are a plurality of roller members 26 which are rotatably mounted on frame 14.

The means 11 rests on a support 27 which is nearly adjacent to the upper end 25 of frame 14, frame 14 being adjustable with respect to support 27 so that belly 12 may be severed from the fat back 13 at the proper place. This is accomplished since frame 14 is movably positioned with respect to base 21. Supports 30 and 31 on base 21 maintain rods 32 and 33, bearings 34 being positioned on the under side of frame 14 and around rods 32 and 33. Hand wheel 35 is secured to rod 36, which is rotatably mounted in bearings 37 and 38 of base 21. The rod 36 is slidably positioned in frame 14 as at 39, and is threadably attached to frame 14 as at 40. Therefore, upon rotation of hand wheel 35, frame 14 is adjusted with respect to base 21 and support 27.

Referring to FIGS. 1 and 3, the rotary knife assembly 16 is securely mounted on frame 14. Supports 45 are mounted on frame 14 and rods 46 are fixed to supports 45. Rods 46 slidably maintain end member 47 and motor support 48, shaft 49 being rotatably mounted in end members 47. Rotary knife 50 is secured to shaft 49. Motor support 48 maintains knife guard 51 around blade 50 and also provides support for motor 52. Sheaves 53 are fixed to shaft 54 of motor 52 and sheaves 55 are fixed to shaft 49. Belts 56 pass around sheaves 53 and 55 so as to rotate shaft 49 upon rotation of motor shaft 54. The vertical position of motor 52 is adjustable by means of bolts 57 and nuts 58. As previously mentioned, end member 47 and motor support 48 are slidably adjustable on rod members 46 so that as the diameter of blade 50 is reduced because of wearing and sharpening, the blade 50 may be lowered with respect to the cutting surface 60.

The apparatus 17 for engaging the meat mass 11 and the carriage 20 are more clearly illustrated in FIG. 5. In the present embodiment, two engaging members 17 and two carriages 20 are utilized. However, there may be as many members 17 and carriages as there are parts into which the mass 11 is to be divided. For present purposes, only one member and one carriage 20 will be described. The apparatus 17 includes a hook 65 which is connected to shaft 66 by arm 67. Shaft 66 is rotatably mounted in support member 68 by means of bearings 69. The end 70 of shaft 67 is connected to arm 71 which is designed to contact stop 72 and stop 73. Stop 72 is adapted to contact arm 71 so as to direct hooks 65 into the meat 11. Likewise, after the cutting operation is completed, stop member 73 is adapted to contact arm 71 and thereby direct hooks 65 out of the meat portions 12 and 13.

The carriage 20 is secured to support member 68 along the roller support plate 75. Support plate 75 provides rotatable support for a plurality of rollers 76, 77, 78 and 79 which are all in rolling contact with tracks or rails 80 and 81. Tracks 80 and 81 are mounted on and extend for substantially the entire length of frame 14. Rollers 79 are positioned in a vertical direction and substantially support the weight of the carriage 20 and attachments. Rollers 78 are in contact with the upper side 85 of rails 80 and 81 so as to provide for smooth movement of carriage 20. Rollers 76 and 77 are positioned in a horizontal direction and prevent carriage 20 from moving off tracks 80 and 81 by contact with sides 86. The carriage assembly 20, by means of the rollers is movable in forward and reverse directions on rails 80 and 81 of frame 14.

The carriage drive motor 90 is mounted on frame 14 and is operably attached to angle gear drive 91 which has a shaft 92 which is attached to shaft 93. Shaft 93 is rotatably mounted on frame 14, sprocket 94 being fixed to shaft 93. Sprocket 95 is secured to shaft 96 which is rotatably mounted at the higher end 25 of frame 14.

Chain 97 engages sprockets 94 and 95. Attaching plate 98 is secured to chain 97 and to carriage 20, so that as chain 97 moves in forward and reverse directions, the carriage 20 will likewise move in forward and reverse directions.

In the operation of the separating apparatus 10, the motor 90, through the chain and sprockets, moves the carriage assembly 20 including the hooks 65 towards the higher end 25 of the frame 14. As carriage 20 approaches the meat 11, arms 71 contact stops 72 and cause the hooked members 65 to be pivoted into the meat 11, which is resting upon table 26. When each hook 65 has engaged each desired portion of the meat mass 11, a limit switch (not shown) is contacted by the carriage assembly 20 and stops and reverses motor 90. It should be mentioned that the relative alignment between table 26 and frame 12 may have been previously adjusted by movement of wheel 35, causing frame 14 to be moved into appropriate alignment with support 26, so that the rotary knife 48 splits the belly from the fat back at an appropriate line of severance.

After the hooks 65 have engaged the meat mass 11 at each of the desired portions 12 and 13, the carriage 20 is moved down the frame 14. The downward movement is facilitated by rollers 26 and also since the frame 14 is angled in a downward direction. As the meat mass 11 proceeds down the frame 14, it is carried through the rotating knife 50, causing the belly 12 to be split from the fat back 13. After severance, each portion 12 and 13 is moved separately. The carriage 20 proceeds down the frame 14, until arm 71 contacts stop 73, which rotates hooks 65 out of each portion 12 and 13.

The momentum of the meat portions 12 and 13 on rollers 26 of the tipped frame 14 causes the portions 12 and 13 to move down the frame without the necessity of external force. The hooks are pivoted from the meat masses 12 and 13, and the motor 90 is stopped and reversed when the carriage 20 contacts a limit switch (not shown). The motor then returns carriage 20 and pick-up hooks 65 to the starting position to start another cycle of operation.

While in the foregoing description there has been a detailed explanation of the apparatus, it is to be understood that there is to be no limitation of the scope of this invention, and it is to be understood that all equivalents obvious to those having ordinary skill are to be included within the scope of the invention.

We claim:

1. Apparatus for severing a part of a hog carcass into a belly portion and a fat back portion, a frame having a higher end and a lower end, a support for said carcass positioned near the higher end of said frame, means for adjusting the position of said frame with respect to said support, a rotary knife mounted on said frame, laterally spaced hooks for engaging said back and said belly, means for directing said hooks into said belly and said back, a carriage for rotatably maintaining said hooks, said carriage being movably mounted on said frame, drive means for moving said carriage on said frame whereby said carcass is carried through said rotary knife in order to separate said belly from said fat back, and means for disengaging said hooks from said belly and said fat back.

2. Apparatus for severing a part of a hog carcass into a belly portion and a fat back portion, comprising a frame having a higher end and a lower end, a support for said carcass positioned near the higher end of said frame, a rotary knife mounted on said frame, laterally-spaced hooks for engaging said back and said belly, means for directing said hooks into said belly and said back a carriage for rotatably maintaining said hooks, said carriage being movably mounted on said frame, drive means for moving said carriage on said frame whereby said carcass is carried through said rotary knife to separate said belly from said fat back, and cooperating means on said frame and carriage for lifting said hooks to disengage them from said belly and said fat back near the lower end of said frame.

3. Apparatus for severing a part of a hog carcass into a belly portion and a fat back portion, comprising an elevated support for said carcass, an inclined frame having an upper end adjacent said support and a lower end therebelow, a rotary knife mounted on said frame, laterally-spaced hooks on opposite sides of said knife for engaging said back and said belly, means for directing said hooks into said belly and said back, a carriage mounted on said frame for longitudinal movement thereof, drive means for moving said carriage whereby said carcass is carried through said rotary knife in order to separate said belly from said fat back, and means at the lower end of said frame for raising said hooks to disengage them from said belly and said fat back after the same have been separated.

References Cited by the Examiner

UNITED STATES PATENTS

| | | | |
|---|---|---|---|
| 1,485,403 | 3/24 | MacDonald et al. | 146—73 XR |
| 2,522,320 | 9/50 | Totten | 146—73 |
| 2,578,496 | 12/51 | Ashlock | 146—241 |
| 2,582,636 | 1/52 | Kruse et al. | 146—73 XR |
| 2,766,477 | 10/56 | Dahlberg | 146—73 XR |
| 2,803,279 | 8/57 | Strand | 146—73 |
| 2,811,997 | 11/57 | Schmidt et al. | 146—241 |
| 2,839,113 | 6/58 | Townsend | 146—73 XR |
| 2,975,810 | 3/61 | Wurgaft | 146—3.11 |

J. SPENCER OVERHOLSER, *Primary Examiner.*

CARL W. ROBINSON, *Examiner.*